Figure 3:
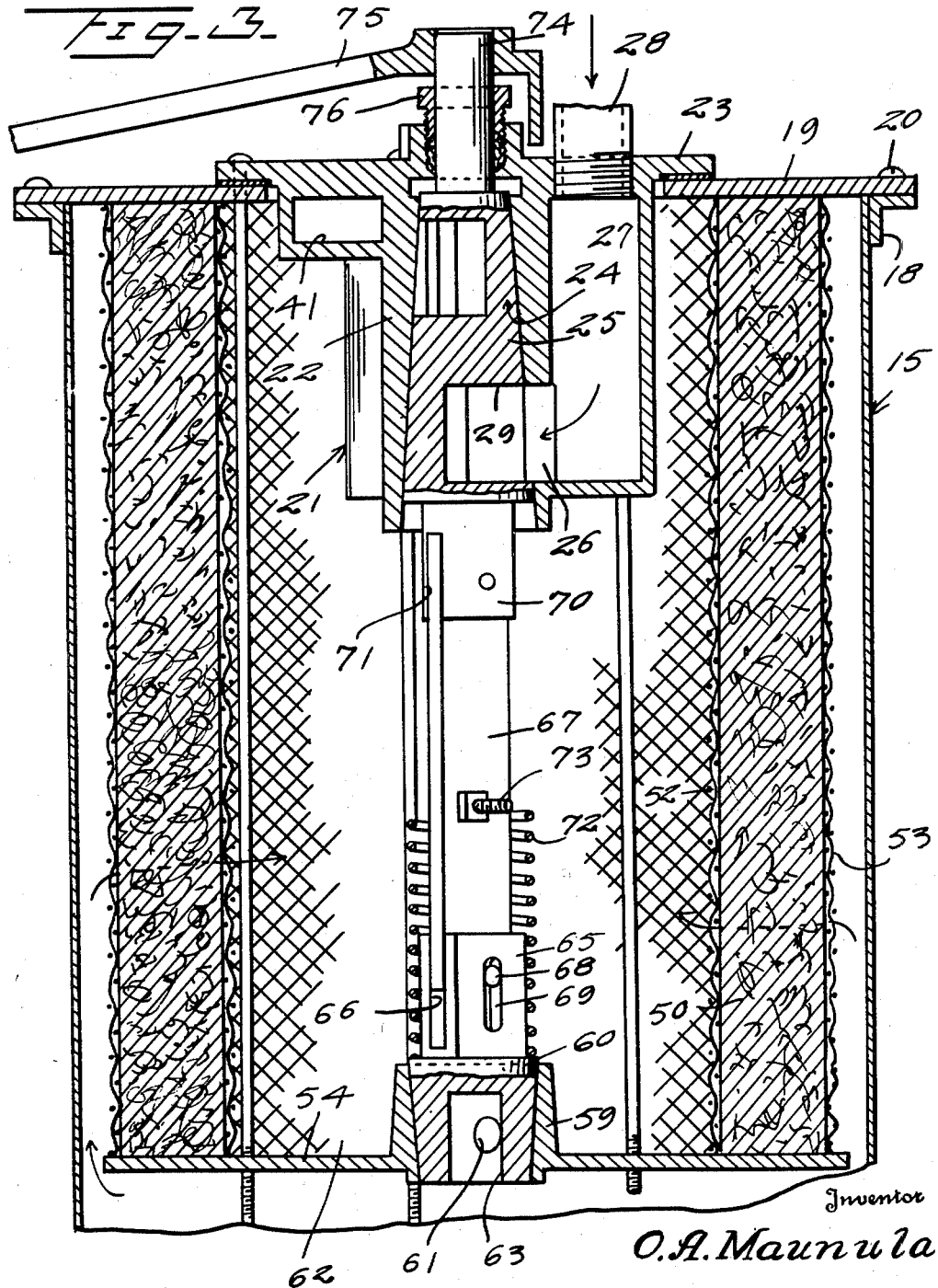

Nov. 28, 1950 O. A. MAUNULA 2,532,177
FILTER CONTROL VALVE
Filed June 23, 1948 5 Sheets-Sheet 1
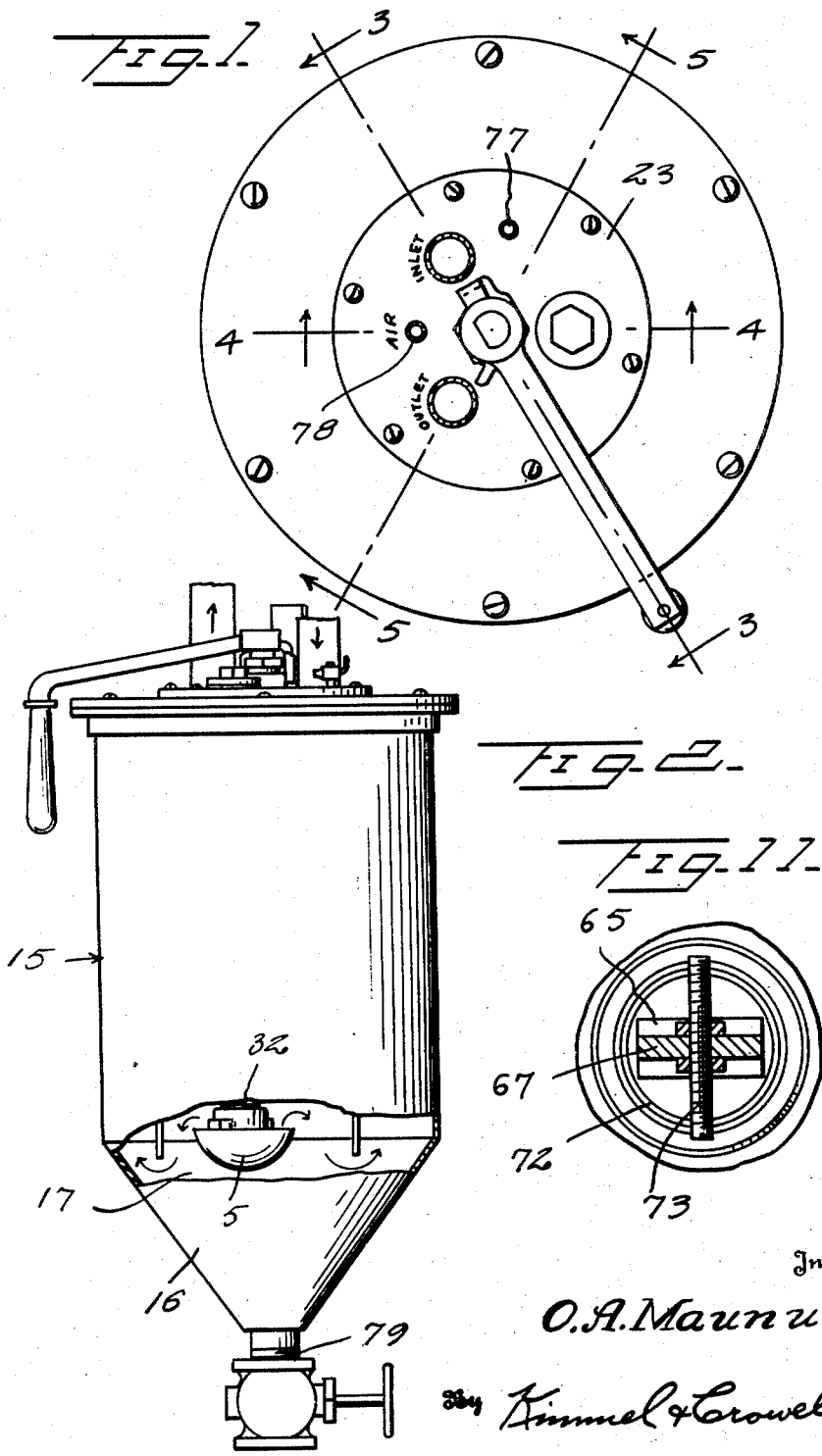
Inventor
O. A. Maunula
By Kimmel & Crowell
Attorneys Nov. 28, 1950

O. A. MAUNULA 2,532,177

FILTER CONTROL VALVE

Filed June 23, 1948

5 Sheets-Sheet 2

Inventor
O. A. Maunula

By Kimmel & Crowell
Attorneys

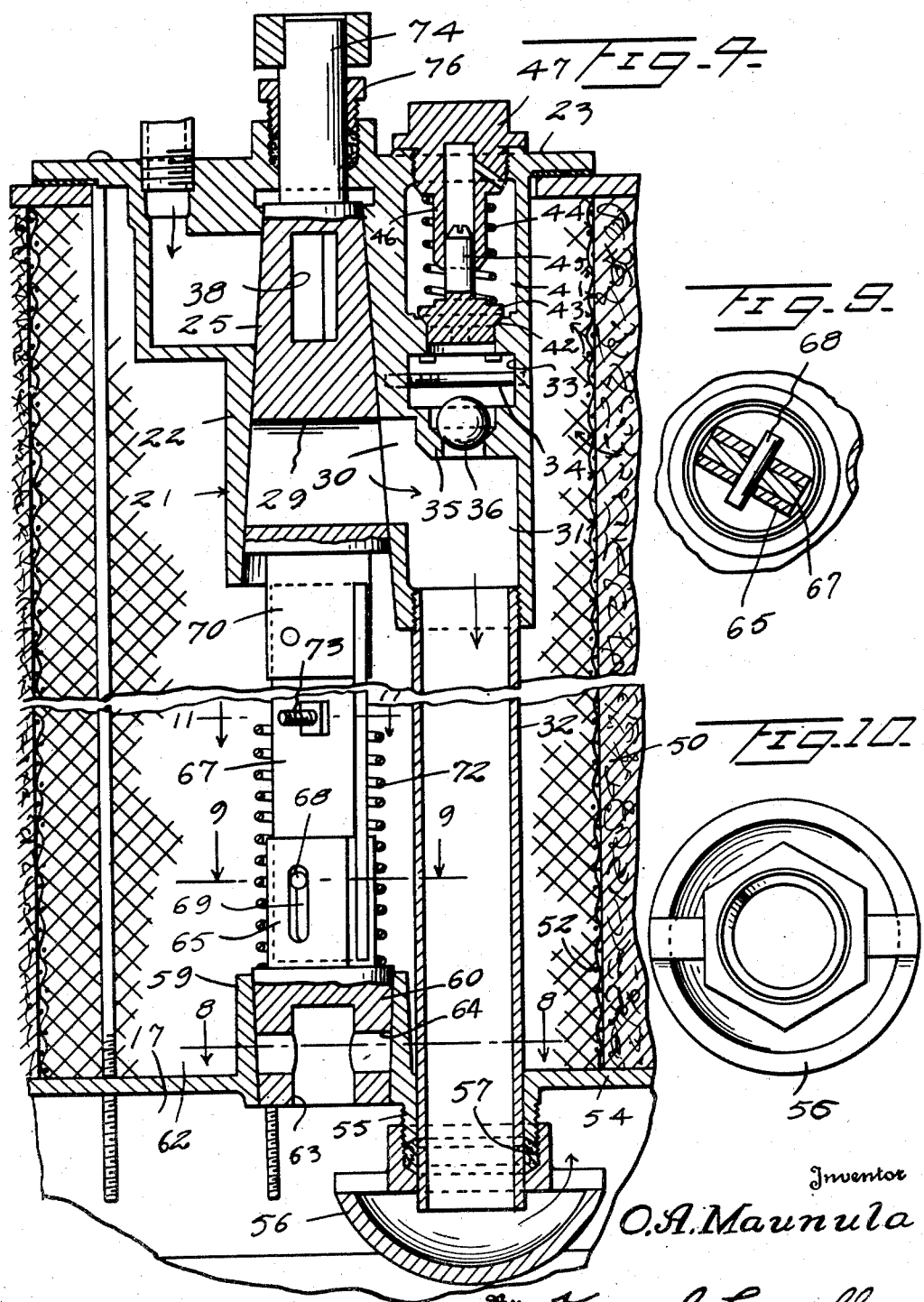

Nov. 28, 1950     O. A. MAUNULA     2,532,177
FILTER CONTROL VALVE
Filed June 23, 1948     5 Sheets-Sheet 4
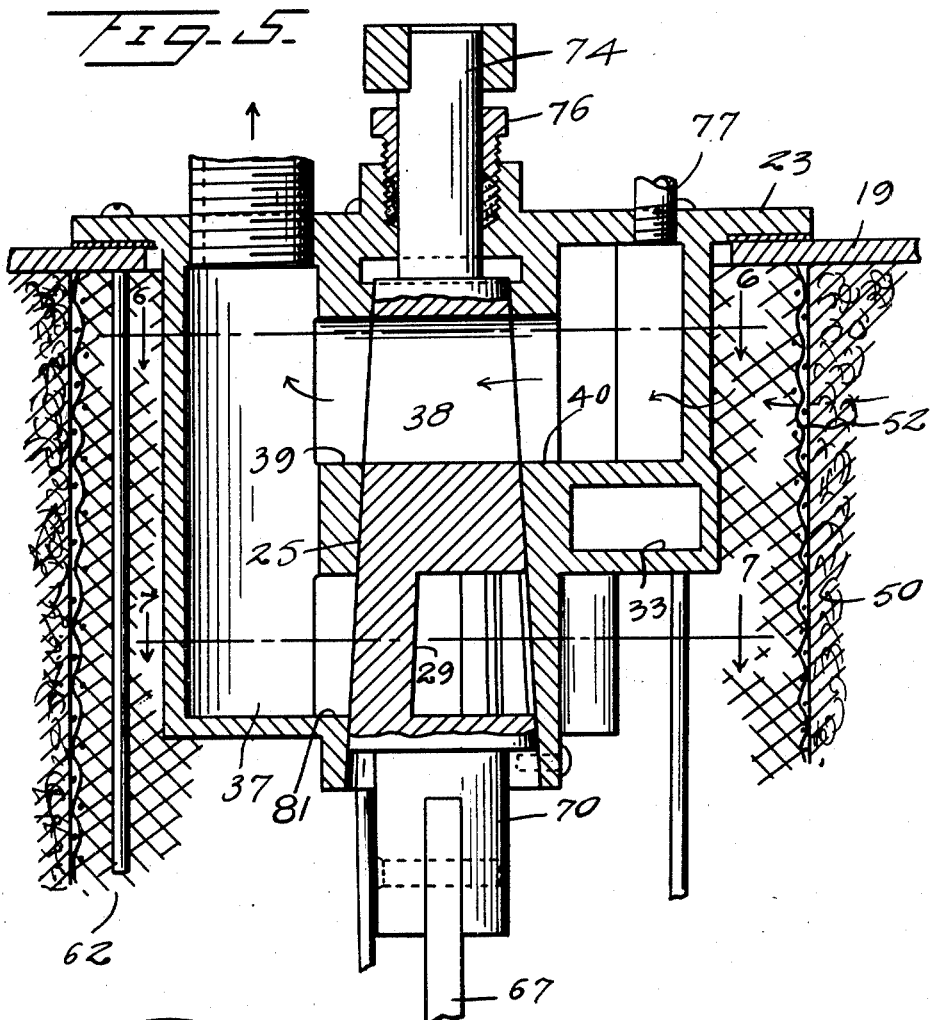
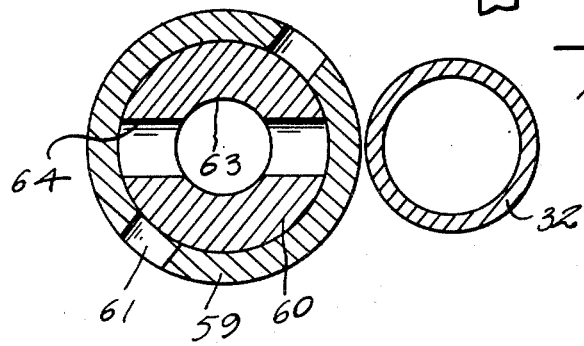
Inventor
O. A. Maunula
By Kimmel & Crowell
Attorneys Nov. 28, 1950 — O. A. MAUNULA — 2,532,177
FILTER CONTROL VALVE
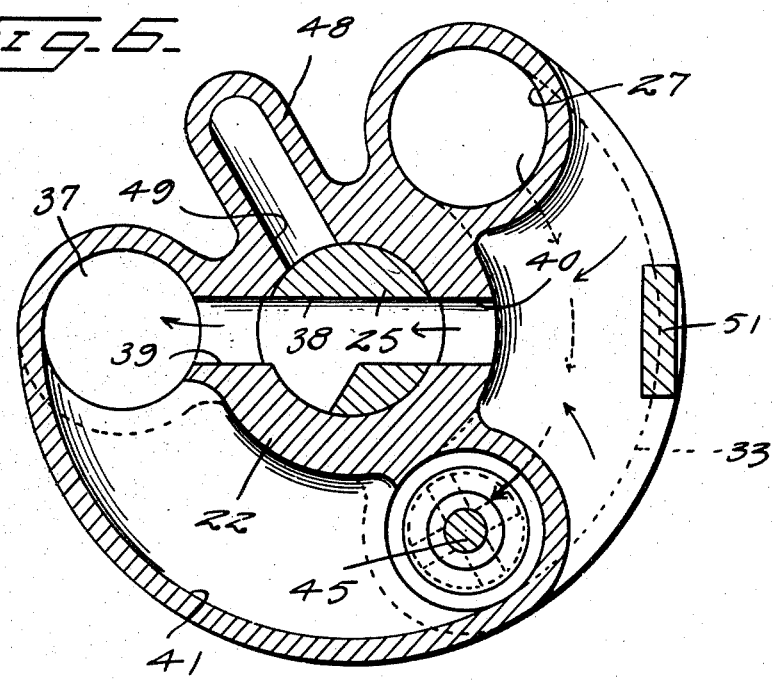
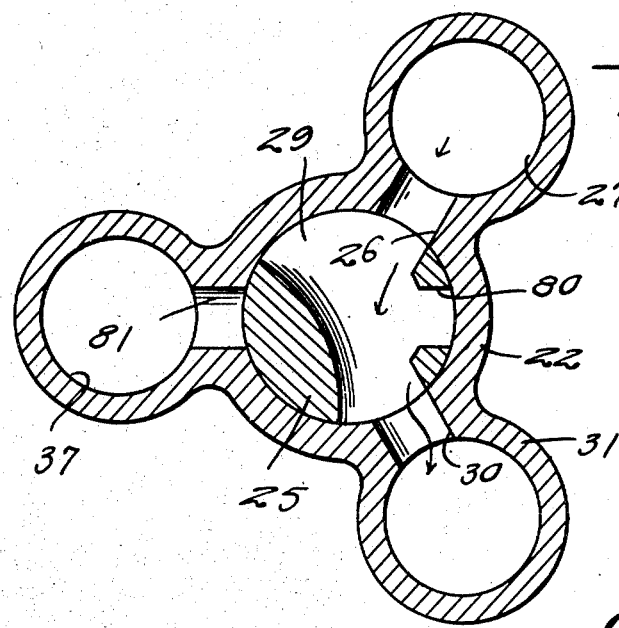

Patented Nov. 28, 1950

2,532,177

UNITED STATES PATENT OFFICE 2,532,177

FILTER CONTROL VALVE

Otto A. Maunula, Palo Alto, Calif.

Application June 23, 1948, Serial No. 34,621

4 Claims. (Cl. 210—183)

This invention relates to oil or other liquid filters, and is an improvement over the construction embodied in my prior Patent No. 1,750,935, issued March 18, 1930, for Oil Filter.

An object of this invention is to provide an oil or liquid filter which can be used on a pressure line and includes safety means whereby the filter unit will be protected against distortion under increased pressure.

Another object of this invention is to provide a filter which can be cleaned and drained with facility and which includes means whereby the filter unit may be by-passed when desired.

A further object of this invention is to provide a filter of this kind wherein the regulating and draining valves are connected together for operation by a single lever or handle.

With the above and other objects in view, my invention consists in the arrangement, combination and details of construction disclosed in the drawings and specification, and then more particularly pointed out in the appended claims.

In the drawings,

Figure 1 is a plan view of a filter constructed according to an embodiment of this invention, Figure 2 is a detail side elevation partly broken away and in section of the device, Figure 3 is a fragmentary sectional view taken on the line 3—3 of Figure 1, Figure 4 is a fragmentary sectional view taken on the line 4—4 of Figure 1, Figure 5 is a fragmentary sectional view taken on the line 5—5 of Figure 1, Figure 6 is a sectional view taken on the line 6—6 of Figure 5, Figure 7 is a sectional view taken on the line 7—7 of Figure 5, Figure 8 is a sectional view taken on the line 8—8 of Figure 4, Figure 9 is a fragmentary sectional view taken on the line 9—9 of Figure 4, Figure 10 is a top plan view of the splash cup, Figure 11 is a sectional view taken on the line 11—11 of Figure 4.

Referring to the drawings, the numeral 15 designates generally an outer housing of generally cylindrical configuration which is formed with a conical lower end 16 forming a combined distributing and settling chamber 17. The housing 15 has secured to the upper end thereof a flanged ring 18 on which a head plate or member 19 is secured by fastening devices 20. A valve structure generally designated as 21 is dependingly mounted within the housing 15 and comprises a vertically disposed body 22 having secured to the upper end thereof a plate 23 which is secured to the upper side of the head plate 19.

The body 22 is formed with an elongated tapered valve seat 24 within which a multi-ported valve plug 25 is rotatably mounted. The body 22 is formed with an intake port 26 communicating with an intake chamber 27 within which an intake pipe 28 is adapted to be connected. The port 26 confronts an intake port 29 formed in the lower portion of the plug 25, which is adapted to be disposed in registry with intake port 26 and also with an outlet port 30 also formed in the body 22.

The body 22 includes an outlet chamber 31 with which the port 30 communicates and a depending pipe 32 is connected at its upper end to the chamber 31 for communicating the fluid to the distributing and settling chamber 17. The body 22 also includes a passage 33 which communicates the inlet chamber 27 with the outlet chamber 30 through a check valve seat 35 which is normally closed by a downwardly closing ball check valve 36.

The body 22 also has secured thereto a return chamber 37 which communicates with an upper return passage or port 38 formed in the plug 25 above the port 29. The body 22 is formed with a return port 39 communicating the return chamber 37 with a diametrically disposed return port 40 also formed in the body 22. The body 22 has secured thereto a by-pass chamber 41 communicating chamber 33 with return chamber 37.

A valve seat 42 is disposed between chamber 33 and chamber 41 and is normally closed by a downwardly closing safety valve 43 normally held on seat 42 by means of a spring 44. The safety valve 43 includes an upwardly extending stem 45 slidable in a guide 46 which is carried by a screw plug 47 threaded through the top plate 23.

The plug 47 also constitutes a means for tensioning the spring 44. The check valve 36 is disposed directly below the safety valve 43 and a stop member 34 in the form of a bolt extends across the chamber 33 a slight distance above the check valve 36 to limit the upward movement of this valve when moved to open position.

The body 22 also has secured thereto an air pressure chamber 48 which is disposed between the two chambers 27 and 37 and communicates with the upper return port 38 of plug 25 when the latter is turned so that port 38 will register with port 49, communicating with air pressure chamber 48. When plug 25 is turned to communicate port 38 with port 49, port 38 will also communicate with port 40 so that air under pressure will be discharged interiorly of a cylindrical filter element 50 which is disposed loosely and in spaced relation about the valve structure 21.

A baffle 51 is carried by the chamber 33 in a position confronting port 40 so as to deflect the air which is being discharged from port 40. The filter 50 which is of cylindrical configuration has disposed on the inner side thereof a reinforcing wire mesh 52 and also has disposed on the outer side thereof an outer wire mesh reinforcing member 53. A plate 54 engages against the lower end of the filter element 50 and provides a dividing means whereby the fluid which is discharged through the lower end of the pipe 32 will be required to flow outwardly of the lower side of plate 54 and then upwardly between filter 50 and housing 15.

The plate 54 is formed with a downwardly extending bushing 55 on which is threaded a splash cup 56. The cup 56 is directed upwardly and is disposed below the lower end of the pipe 32, being sealed with respect to the bushing 55 by means of a sealing member 57. The plate 54 is formed with a drain bushing or seat 59 within which a tapered drain valve 60 is rotatably mounted. The bushing or seat 59 is formed with a pair of diametrically disposed ports 61 (as shown in Figure 8), so that fluid in inner chamber 62 which is positioned on the inside of element 50 may be drained from the lower portion of the chamber 62.

The valve plug 60 is formed with a central bore 63 and a pair of lateral ports 64 adapted upon rotation of plug 60 in one direction to be disposed in registry with ports 61. An upwardly extending stem 65 is carried by the plug 60 and is formed with a vertically disposed slot 66 within which a coupling link 67 is adapted to be slidingly mounted.

A pin 68 extends through the lower portion of link 67 and loosely engages in a pair of vertically disposed slots 69 formed in the stem 65 so that plug 60 may have relative endwise movement with respect to link 67. The upper end of link 67 is secured to a downwardly extending stem 70 formed on the upper or main plug 25, the latter being formed with a slot 71 within which the link 67 is secured. A spring 72 engages about the lower portion of link 67 and also engages about stem 65, bearing at its lower end against the upper large end of tapered plug 60. The upper end of spring 72 bears against a pin or bolt 73 which extends through link 67 so that spring 72 will constantly urge both plugs 25 and 60 onto their respective seats. The main plug 25 also includes an upper stem 74 extending above the top plate 23 and on which an operating handle 75 is adapted to be secured. A gland 76 seals the upper stem or stud 74 with respect to the plate 23.

The plate 23 has a pipe 77 extending therethrough and a conventional pressure gauge is adapted to be mounted on pipe 77. An air pressure pipe 78 is adapted to be secured to plate 23 for communicating air chamber 48 with a source of air pressure supply.

The distributing and settling chamber 17 has connected therewith a drain valve 79 so that the settlings in chamber 17 may be drained therefrom at the time valve plug 60 is turned to draining position.

In the use and operation of this device, the inlet chamber 27 is connected to a source of fluid supply and the return chamber 37 is connected to the return line of the fluid. In normal operation valve plug 25 will be turned to the positions shown in Figures 6 and 7. The fluid will flow from chamber 27 through port 26, port 29 and port 30, into outlet chamber 31. The fluid will then flow down through pipe 32 into the distributing and settling chamber 17 and will rise upwardly on the outer side of the filter 50. The fluid will return into chamber 62 through filter 50 and will then pass through return passage 40 of body 22, return passage 38 of plug 25, and return passage 39 into return chamber 37. At the time the filter is in normal use, drain valve plug 60 will be in closed position.

When it is desired to drain the filter structure, operating lever or handle 75 is turned to rotate plug 25 in valve body 22 so that port 26 will register with port 80 formed in the plug for communication with port 81 and closing port 30 to permit oil to by-pass the filter, and at the same operation plug 60 is caused to rotate in body 59 so as to communicate ports 64 with ports 61. In the event the pressure in chamber 33 is above a predetermined maximum, valve 43 will be moved upwardly to open position so that the fluid will flow from chamber or passage 33 to by-pass chamber or passage 41. At the same time check valve 36 may also be moved upwardly to open position so as to relieve pressure in outlet chamber 31.

When it is desired to clean the filter structure, operating lever or handle 75 is turned to rotate plug 25 so that port 26 will remain in communication with port 81 to permit oil to by-pass the filter and to place air port 49 in communication with port 40 through port 38 in plug 25, and at the same time rotate plug 60 in body 59 so that the ports 64 formed therein are out of communication with ports 61 in body 59. This permits the filter to be cleaned and drained while oil is flowing through the system.

In the event there is excessive pressure in lower chamber 17 below plate 54, this pressure is relieved by upward movement of valve plug 60 which will communicate chamber 17 with chamber 62.

I do not mean to confined myself to the exact details of construction herein disclosed, but claim all variations falling within the purview of the appended claims.

What I claim is:

1. A filter comprising a cylindrical housing, a head secured to the upper end of said housing, a valve body dependingly carried by said head, said body having a central elongated valve seat, a multi-ported plug engaging said seat, said body having an inlet passage communicating with one of said plug ports and a return passage communicating with another of said plug ports, inlet conduit means connected to said body and communicating with said inlet passage, return conduit means connected to said body and communicating with said return passage, said body having a by-pass passage communicating said inlet passage with said return passage, a normally closed spring-pressed safety valve between said by-pass passage and said inlet passage, a cylindrical filter element in said housing about said body, a lower plate engaging and closing the lower end of said element, said body having an outlet chamber communicating with said one plug port, a pipe communicating said chamber with the space below said plate, an upwardly directed splash cup carried by said pipe below said plate, a drain valve plug carried by said plate, and means connecting said drain plug with said first named plug for operation thereby.

2. A filter comprising a cylindrical housing, a head secured to the upper end of said housing, a valve body dependingly carried by said head, said body having a central elongated valve seat, a multi-ported plug engaging said seat, said body having an inlet passage communicating with one of said plug ports and a return passage communicating with another of said plug ports, inlet conduit means connected to said body and communicating with said inlet passage, return conduit means connected to said body and communicating with said return passage, said body having a by-pass passage communicating said inlet passage with said return passage, a normally closed spring-pressed safety valve between said by-pass passage and said inlet passage, a cylindrical filter element in said housing about said body, a lower plate engaging and closing the lower end of said element, said body having an outlet chamber communicating with said one plug port, a pipe communicating said chamber with the space below said plate, an upwardly directed splash cup carried by said pipe below said plate, a drain valve seat carried by said plate, a drain plug engaging said socket, and means connecting said plugs together.

3. A filter comprising a cylindrical housing, a head secured to the upper end of said housing, a valve body dependingly carried by said head, said body having a central elongated valve seat, a multi-ported plug engaging said seat, said body having an inlet passage communicating with one of said plug ports and a return passage communicating with another of said plug ports, inlet conduit means connected to said body and communicating with said inlet passage, return conduit means connected to said body and communicating with said return passage, said body having a by-pass passage communicating said inlet passage with said return passage, a normally closed spring-pressed safety valve between said by-pass passage and said inlet passage, cylindrical filter element in said housing about said body, a lower plate engaging and closing the lower end of said element, said body having an outlet chamber communicating with said one plug port, a pipe communicating said chamber with the space below said plate, an upwardly directed splash cup carried by said pipe below said plate, a drain valve seat carried by said plate, a drain plug engaging said seat, a loose coupling between said plugs, and a spring about said coupling constantly urging said plugs toward their respective seats.

4. A filter comprising a cylindrical housing, a head secured to the upper end of said housing, a valve body dependingly carried by said head, said body having a central elongated valve seat, a multi-ported plug engaging said seat, said body having an inlet passage communicating with one of said plug ports and a return passage communicating with another of said plug ports, inlet conduit means connected to said body and communicating with said inlet passage, return conduit means connected to said body and communicating with said return passage, said body having a by-pass passage communicating said inlet passage with said return passage, a normally closed spring-pressed safety valve between said by-pass passage and said inlet passage, a downwardly closing check valve between said by-pass passage and said outlet chamber, a cylindrical filter element in said housing about said body, a lower plate engaging and closing the lower end of said element, said body having an outlet chamber communicating with said one plug port, and means communicating said chamber with the space below said plate whereby the fluid will be discharged into said housing below said plate for passage through said element and into said return passage.

OTTO A. MAUNULA.

REFERENCES CITED

The following references are of record in the file of this patent:

UNITED STATES PATENTS

| Number | Name | Date |
|---|---|---|
| 98,503 | Johnson | Jan. 4, 1870 |
| 226,249 | Scannell et al. | Apr. 6, 1880 |
| 230,347 | Scannell et al. | July 20, 1880 |
| 282,313 | Haynes | July 31, 1883 |
| 603,834 | Sprague | May 10, 1898 |
| 1,062,236 | Hitchcock | May 20, 1913 |
| 1,270,162 | Jay | June 18, 1918 |
| 1,539,910 | Parish | June 2, 1925 |
| 1,750,935 | Maunula | Mar. 18, 1930 |
| 1,822,006 | Bull | Sept. 8, 1931 |